US008159673B2

(12) United States Patent
Kitao

(10) Patent No.: US 8,159,673 B2
(45) Date of Patent: Apr. 17, 2012

(54) LIGHT AMOUNT DETECTOR, MISALIGNMENT AMOUNT DETECTOR, AND IMAGE DENSITY DETECTOR

(75) Inventor: Katsuyuki Kitao, Zama (JP)

(73) Assignee: Ricoh Company, Ltd., Tokyo (JP)

( * ) Notice: Subject to any disclaimer, the term of this patent is extended or adjusted under 35 U.S.C. 154(b) by 642 days.

(21) Appl. No.: 12/314,165

(22) Filed: Dec. 5, 2008

(65) Prior Publication Data

US 2009/0147258 A1 Jun. 11, 2009

(30) Foreign Application Priority Data

Dec. 5, 2007 (JP) ................................ 2007-315008

(51) Int. Cl.
*G01B 11/00* (2006.01)

(52) U.S. Cl. ........ 356/399; 356/401; 356/406; 356/419; 356/444

(58) Field of Classification Search .......... 356/399–401, 356/444, 419
See application file for complete search history.

(56) References Cited

U.S. PATENT DOCUMENTS

| | | | | |
|---|---|---|---|---|
| 5,157,440 | A | 10/1992 | Sawayama | |
| 5,630,195 | A | 5/1997 | Sawayama et al. | |
| 6,633,382 | B2 * | 10/2003 | Hubble et al. | 356/402 |
| 6,650,416 | B2 * | 11/2003 | Tandon et al. | 356/420 |
| 6,671,059 | B2 * | 12/2003 | Frisa et al. | 356/630 |
| 6,809,855 | B2 * | 10/2004 | Hubble et al. | 359/320 |
| 7,259,857 | B2 * | 8/2007 | Butterfield et al. | 356/444 |
| 7,360,886 | B2 | 4/2008 | Kitao | |
| 2002/0102114 | A1 | 8/2002 | Kawanishi | |
| 2004/0251435 | A1 | 12/2004 | Sawayama et al. | |
| 2005/0195235 | A1 | 9/2005 | Kitao | |
| 2005/0244177 | A1 | 11/2005 | Iwakawa | |
| 2006/0164506 | A1 | 7/2006 | Kitao | |
| 2006/0170754 | A1 | 8/2006 | Kitao | |
| 2007/0053024 | A1 | 3/2007 | Kitao | |

FOREIGN PATENT DOCUMENTS

| | | |
|---|---|---|
| JP | 09-238260 | 9/1997 |
| JP | 11-069159 | 3/1999 |
| JP | 3266849 | 1/2002 |
| JP | 2003-228216 | 8/2003 |
| JP | 3518825 | 2/2004 |

OTHER PUBLICATIONS

European Search Report dated Apr. 9, 2009 for corresponding European Application No. 08253857.0.
Chinese Office Action dated Apr. 13, 2010 for corresponding Chinese Application No. 200810184854.4.
English language Abstract JP 09-244341 dated Sep. 19, 1997.
English language Abstract JP 11-272037 dated Oct. 8, 1999.

* cited by examiner

*Primary Examiner* — Tarifur Chowdhury
*Assistant Examiner* — Isiaka Akanbi
(74) *Attorney, Agent, or Firm* — Harness, Dickey & Pierce, P.L.C.

(57) ABSTRACT

A light amount detector includes a light emitter, a light receiver, and a light amount detection unit. The light emitter emits light on a detection pattern formed on a detection surface of an image carrier. The light receiver detects diffused light reflected from the detection pattern. The light amount detection unit detects an amount of light received by the light receiver based on detection output of the light receiver. One of the light emitter and the light receiver is provided at a position directly opposite to the detection surface, such that a distribution of sensitivity of the light receiver detecting the diffused light is substantially symmetrical with respect to a detection output peak when the detection surface is substantially parallel to a hypothetical line connecting the light emitter with the light receiver.

17 Claims, 7 Drawing Sheets

LIGHT AMOUNT DETECTOR, MISALIGNMENT AMOUNT DETECTOR, AND IMAGE DENSITY DETECTOR

PRIORITY STATEMENT

The present patent application claims priority from Japanese Patent Application No. 2007-315008, filed on Dec. 5, 2007 in the Japan Patent Office, the entire contents of which are hereby incorporated herein by reference.

BACKGROUND OF THE INVENTION

1. Field of the Invention

Example embodiments generally relate to a light amount detector, a misalignment amount detector, and an image density detector, for example, for efficiently detecting an amount of misalignment based on detection of light from an image formed on an image carrier.

2. Description of the Related Art

Image forming apparatuses, such as copiers, facsimile machines, printers, and multifunction devices having at least one of copying, printing, scanning, and facsimile functions, typically form a toner image on a recording medium (e.g., a transfer sheet) based on image data using electrophotography.

In full color image formation, especially with tandem-type image forming apparatuses, it is important to minimize misalignment, between magenta, cyan, yellow, and black toner images formed on a transfer sheet. A tandem-type image forming apparatus includes four sets of optical writers and image carriers to independently form magenta, cyan, yellow, and black toner images, which often leads to misalignment between the individual toner images.

Generally, an optical sensor is provided to detect such misalignment. For example, the optical sensor uses a misalignment detection pattern formed on a transfer belt to detect an amount by which the color toner images are out of alignment with each other (misaligned). Based on that detection, the optical writer corrects image writing timing to prevent misalignment.

One example of related-art misalignment correction methods uses a diffused light sensor for detecting an amount of light. FIG. 1 is a schematic sectional view of such a related-art diffused light sensor 100R. The diffused light sensor 100R includes a light emitter 110R and a light receiver 120R, with respective optical axes 121R and 111R. A misalignment detection pattern 131R is formed on a transfer belt and conveyed in a sub-scanning direction D. When the light emitter 110R illuminates the pattern 131R, the light receiver 120R receives diffused light reflected from the pattern 131R.

FIG. 2 is a schematic view of several examples of misalignment detection patterns P1, P2, P3 . . . P9 (P1 to P9) provided on a transfer belt in a sub-scanning direction and a sensor spot SP of detection of the diffused light sensor 100R. In the detection patterns P1 to P9, black reference color patches K1 to K9 and yellow patches Y1 to Y9 are partially superimposed on yet offset from each other by different amounts. For example, in the detection pattern P1, the yellow patch Y1 is offset from the black patch K1 by a maximum amount of $\alpha$, which equals a width of the yellow patch Y1, that is, the black patch K1 is not superimposed on the yellow patch Y1. However, in the detection pattern P5, the black patch K5 and the yellow patch Y5 are perfectly superimposed, so that the amount of misalignment $\alpha$ is 0, that is, there is no misalignment in position between the black patch K1 and the yellow patch Y1. In the detection pattern P9, the yellow patch Y9 is offset from the black patch K9 in a direction opposite to a direction of offset in the detection pattern P1 by the maximum amount of $\alpha$. That is, in the detection patterns P1 and P9, the black patches K1 and K9 are offset from the yellow patches Y1 and Y9 in the opposite directions by the same amount $\alpha$.

The sensor spot SP indicates an area of detection by the diffused light sensor 100R depicted in FIG. 1, and is substantially egg-shaped, as illustrated in FIG. 2, which results in a difference in sensitivity output of the diffused light sensor 100R detecting the patterns P1 and P9 having the same amount of misalignment $\alpha$.

In addition, since both the optical axis 111R and the optical axis 121R are inclined toward a detection surface 130R in the direction D in which the transfer belt is conveyed, as illustrated in FIG. 1, the diffused light sensor 100R is blind to one side of the pattern 131R in a direction 141R and not blind to another side of the pattern 131R in a direction 142R. This results in a difference in sensitivity output of the diffused light sensor 100R detecting the patterns P1 and P9 having the same amount of misalignment $\alpha$, causing a detection error in the amount of misalignment. As a result, the diffused light sensor 100R decreases the precision of detection.

Accordingly, there is a need for a technology to efficiently detect an amount of offset among different color patches.

SUMMARY

At least one embodiment provides a light amount detector that includes a light emitter, a light receiver, and a light amount detection unit. The light emitter is configured to direct light onto a detection pattern formed on a detection surface of an image carrier. The light receiver is configured to detect diffused light reflected from the detection pattern. The light amount detection unit is configured to detect an amount of light received by the light receiver based on detection output of the light receiver. One of the light emitter and the light receiver is provided at a position directly opposite to the detection surface, such that a distribution of sensitivity of the light receiver detecting the diffused light is substantially symmetrical with respect to a peak detection output when the detection surface is substantially parallel to a hypothetical line connecting the light emitter with the light receiver.

At least one embodiment provides a misalignment amount detector that includes a light amount detector and a misalignment amount detection unit. The light amount detector is configured to detect an amount of light and includes a light emitter, a light receiver, and a light amount detection unit as described above. The misalignment amount detection unit is configured to detect an amount of misalignment based on a result of detection by the light amount detector detecting a detection pattern formed as a misalignment detection pattern.

At least one embodiment provides an image density detector including a light amount detector and an image density detection unit. The light amount detector is configured to detect an amount of light and includes a light emitter, a light receiver, and a light amount detection unit as described above. The image density detection unit is configured to detect image density based on a result of detection by the light amount detector detecting a detection pattern formed as an image density detection pattern.

Additional features and advantages of example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein.

Figure 1:
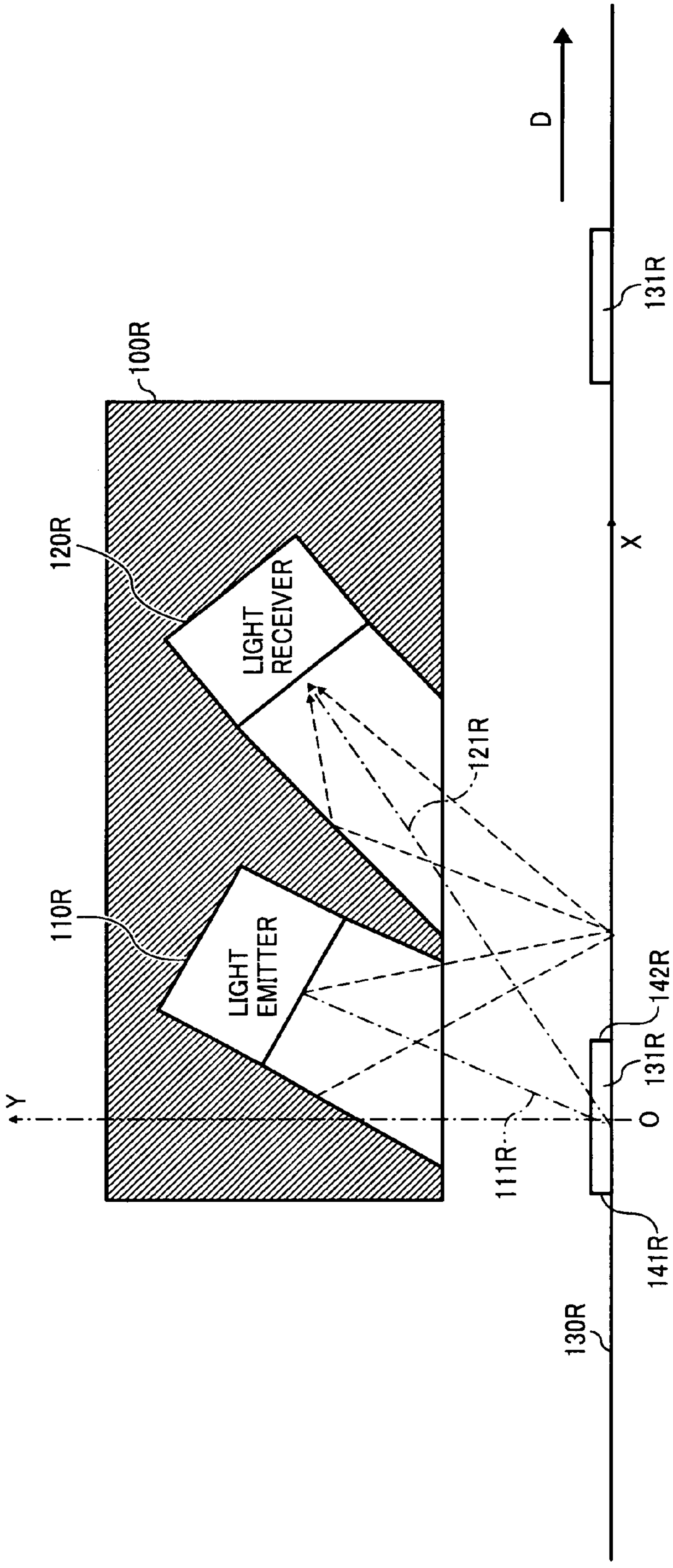
FIG. 1 RELATED ART
FIG. 1 is a schematic sectional view of a related-art diffused light sensor.

The accompanying drawings are intended to depict example embodiments and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner and achieve a similar result.

Figure 3:
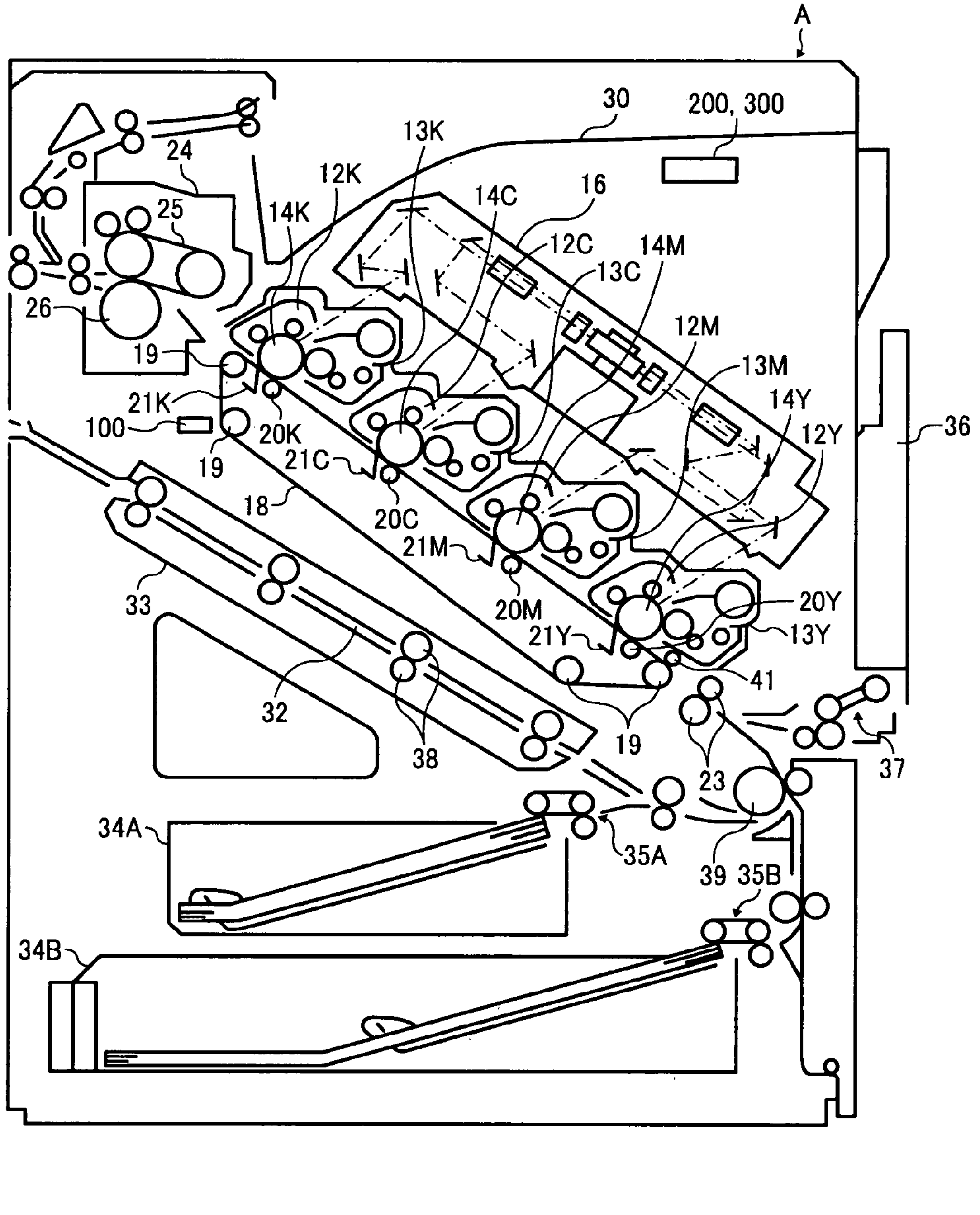
FIG. 3 is a schematic view of a tandem-type image forming apparatus according to an example embodiment of the present invention.

Referring now to the drawings, wherein like reference numerals designate identical or corresponding parts throughout the several views thereof, in particular to FIG. 3, an image forming apparatus A according to an example embodiment of the present invention are described.

FIG. 3 is a schematic view of the tandem-type image forming apparatus A. The image forming apparatus A includes a bypass tray 36, paper trays (first and second paper trays) 34A and 34B, feed rollers 35A and 35B, feed rollers 37, an intermediate roller 39, a registration roller pair 23, a transfer belt 18, a sheet attraction roller 41, transfer brushes 21Y, 21M, 21C, and 21K, driving rollers 19, a fixing device 24, an output tray 30, a duplex conveyance unit 33, image forming units 12Y, 12M, 12C, and 12K, development units 13Y, 13M, 13C, and 13K, rollers 20Y, 20M, 20C, and 20K, a writing unit 16, a sensor 100, and a misalignment calculation controller 200. The fixing device 24 includes a fixing belt 25 and a pressing roller 26. The duplex conveyance unit 33 includes conveyance rollers 38 and a conveyance path 32. The image forming units 12Y, 12M, 12C, and 12K include photoconductor drums 14Y, 14M, 14C, and 14K, respectively.

The image forming apparatus A may be a copier, a facsimile machine, a printer, a multifunction printer having at least one of copying, printing, scanning, and facsimile functions, or the like. According to this non-limiting example embodiment, the image forming apparatus A functions as a tandem-type color copier for forming a color image on a recording medium (e.g., a transfer sheet) by electrophotography. However, the image forming apparatus A is not limited to the color copier and may form a color and/or monochrome image in other configurations.

The image forming apparatus A includes three paper trays including the bypass tray 36 and the first and the second paper trays 34A and 34B. A transfer sheet fed from the bypass tray 36 is directly conveyed to the registration roller pair 23 by the feed rollers 37. When the first and the second paper trays 34A and 34B feed a transfer sheet, the feed rollers 35A and 35B convey the transfer sheet to the registration roller pair 23 via the intermediate roller 39. When a registration clutch is engaged at a time when an image formed on each of the photoconductor drums 14Y, 14M, 14C, and 14K meets a leading edge of the transfer sheet, the transfer sheet is conveyed to the transfer belt 18. When passing through a sheet attraction nip formed between the transfer belt 18 and the sheet attraction roller 41 contacting the transfer belt 18, the transfer sheet is attracted to the transfer belt 18 due to a bias applied to the sheet attraction roller 41 and conveyed at a predetermined process linear velocity.

The rollers 20Y, 20M, 20C, and 20K oppose the photoconductor drums 14Y, 14M, 14C, and 14K, respectively, to cause the transfer belt 18 to contact the photoconductor drums 14Y, 14M, 14C, and 14K, respectively. When the transfer sheet is attracted to the transfer belt 18, a transfer bias (+) with a polarity opposite to a polarity (−) of charged toner is applied to the transfer brushes 21Y, 21M, 21C, and 21K provided opposite to the photoconductor drums 14Y, 14M, 14C, and 14K, respectively, across the transfer belt 18, and yellow, magenta, cyan, and black toner images formed on the photoconductor drums 14Y, 14M, 14C, and 14K, respectively, are sequentially transferred to the transfer sheet in this order.

It is to be noted that, according to this example embodiment, since the image forming apparatus A is a tandem-type image forming apparatus using a direct transfer method of directly transferring an image to a transfer sheet on the transfer belt 18, also called a conveyance belt, for conveying while attracting the transfer sheet. Alternatively, however, the image forming apparatus A may use an indirect transfer method of primarily transferring an image to an intermediate transfer belt and then secondarily transferring the image to a transfer sheet.

After the respective toner images are transferred to the transfer sheet, the transfer sheet separates from the transfer belt 18 by self stripping due to curvature of the driving rollers 19 of a transfer unit, and is conveyed to the fixing device 24. When the transfer sheet passes through a fixing nip formed between the fixing belt 25 and the pressing roller 26, the toner images are fixed to the transfer sheet. Thereafter, in single-sided printing, the transfer sheet is discharged to the output tray 30.

In duplex printing, after passing the fixing device 24, the transfer sheet is conveyed to a reversing unit for reversing the transfer sheet. The reversed transfer sheet is conveyed to the duplex conveyance unit 33 provided below the transfer unit. The transfer sheet is conveyed toward the intermediate roller 39 through the conveyance path 32 by the conveyance rollers 38. When being conveyed to the registration roller pair 23 again, the transfer sheet is subjected to a process similar to that performed in the single-sided printing as described above. After passing the fixing device 24, the transfer sheet is discharged to the output tray 30.

A description is now given of operation of an image forming device of the image forming apparatus A.

The image forming units 12Y, 12M, 12C, and 12K including the photoconductor drums 14Y, 14M, 14C, and 14K, charging rollers, and cleaners, respectively, and the development units 13Y, 13M, 13C, and 13K form the image forming devices, respectively. In image formation, the photoconductor drums 14Y, 14M, 14C, and 14K are driven to rotate by motors, respectively, and discharged by the charging rollers supplied with an AC (alternating-current) bias (without DC (direct-current) components), respectively, so that respective surfaces of the photoconductor drums 14Y, 14M, 14C, and 14K have a reference potential of about −50 V, for example.

By supplying the charging rollers with a DC bias on which an AC bias is superimposed, the photoconductor drums 14Y, 14M, 14C, and 14K are uniformly charged with a potential substantially equal to that of a DC component to be charged with a surface potential of from about −500 v to about −700 v. It is to be noted that a target charging potential is determined by a process control device. When digital information of a printing image transmitted from a controller is converted into a binarized LD (laser diode) emission signal for each color, the converted signals are directed onto the respective surfaces of the photoconductor drums 14Y, 14M, 14C, and 14K via a cylinder lens, a polygon motor, a fθ lens, first to third mirrors, and a WTL (long troidal) lens, all of which are included in the writing unit 16, so that a radiated portion of each of the respective surfaces of the photoconductor drums 14Y, 14M, 14C, and 14K has a surface potential of about −50 v, for example, thereby forming an electrostatic latent image on the photoconductor drums 14Y, 14M, 14C, and 14K, respectively, based on the image information.

In a development process, when each development sleeve of the development units 13Y, 13M, 13C, and 13K is supplied with a DC bias of from about −30 v to about −500 v, on which an AC bias is superimposed, respectively, toner having a charge quantity (Q/M) of from about −20 μC/g to about −30 μC/g develops only an image portion with decreased potential due to writing by the LD, thereby making the electrostatic latent image visible as a toner image.

Thereafter, when the transfer sheet is conveyed from the registration roller 23 and passes through the sheet attraction nip formed between the sheet attraction roller 41 and the transfer belt 18 to be attracted to the transfer belt 18, the respective color toner images formed on the photoconductor drums 14Y, 14M, 14C, and 14K are transferred onto the transfer belt 18 due to a bias (transfer bias) of a polarity opposite to a polarity of charged toner applied to the transfer brushes 21Y, 21M, 21C, and 21K opposing the photoconductor drums 14Y, 14M, 14C, and 14K across the transfer belt 18.

Figure 4:
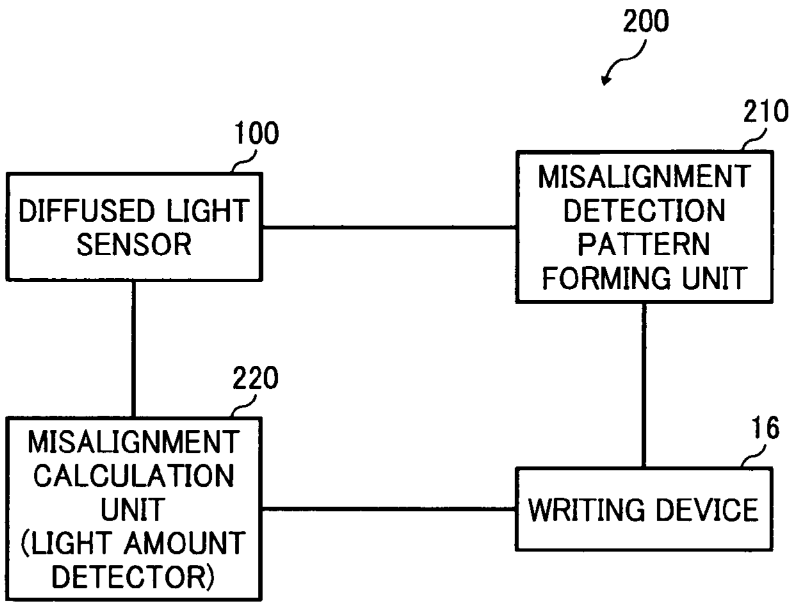
FIG. 4 is a block diagram of a misalignment calculation controller included in the image forming apparatus shown in FIG. 3.
Figure 5:
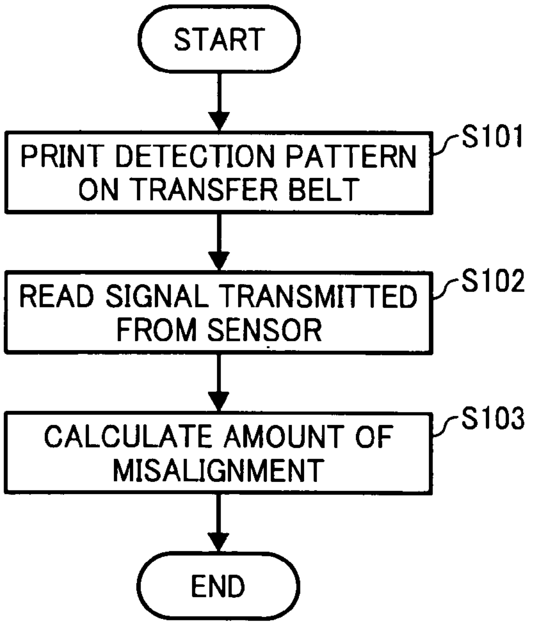
FIG. 5 is a flowchart illustrating a misalignment calculation process performed by the misalignment calculation controller shown in FIG. 4.
Figure 6:
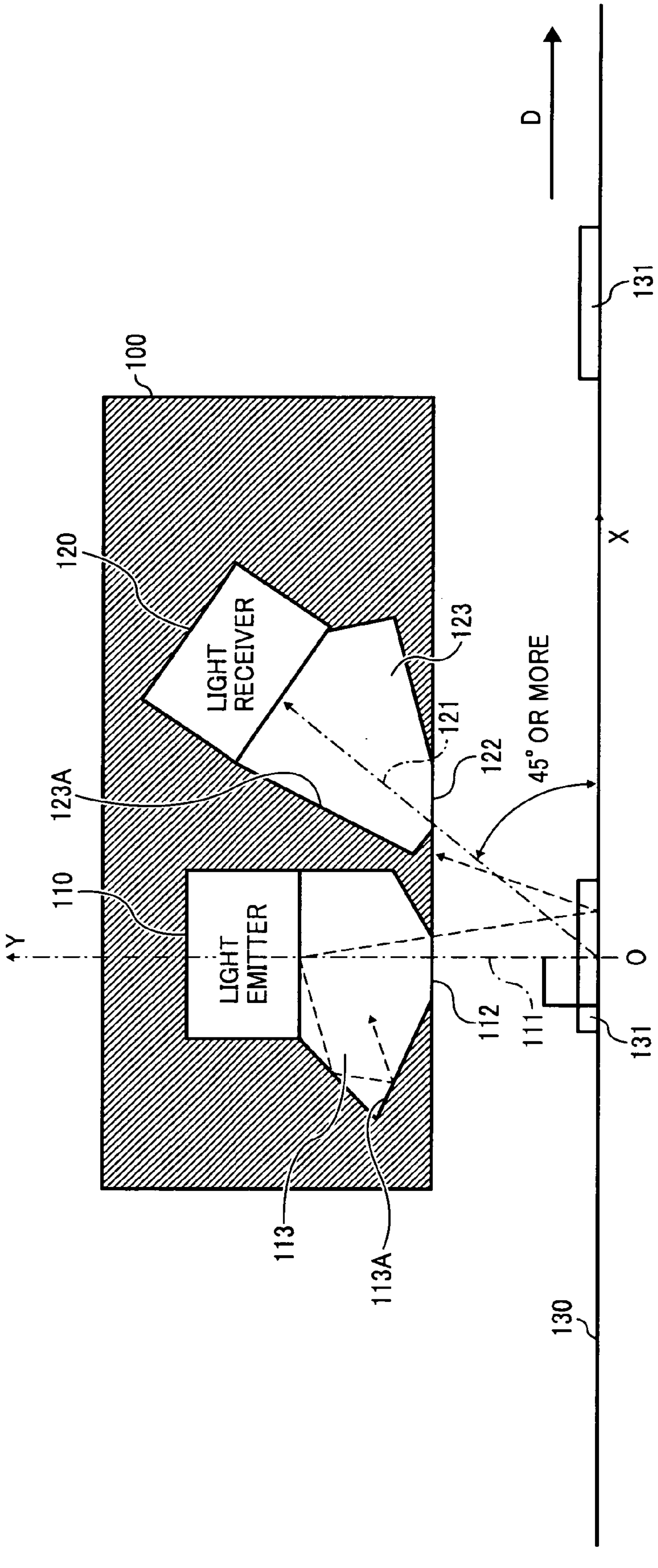
FIG. 6 is a schematic sectional view of a diffused light sensor included in the misalignment calculation controller shown in FIG. 4.

Referring to FIGS. 4, 5, and 6, a description is now given of calculation and correction of an amount of misalignment in color (position) of a toner image formed on a transfer sheet.

FIG. 4 is a block diagram of the misalignment calculation controller 200, serving as a misalignment amount detector. The misalignment calculation controller 200 includes a misalignment detection pattern forming unit 210, a misalignment calculation unit (light amount detector) 220, the diffused light sensor 100, and the writing unit 16.

FIG. 5 is a flowchart illustrating a misalignment calculation process. In step S101, when the misalignment detection pattern forming unit 210 commands the writing unit 16 depicted in FIG. 3 to print a misalignment detection pattern, the writing unit 16 prints the misalignment detection pattern on the transfer belt 18 depicted in FIG. 3. In step S102, when the diffused light sensor 100 depicted in FIG. 3 detects diffused light reflected from the misalignment detection pattern, the misalignment calculation unit 220, serving as a light amount detection unit, reads a signal transmitted from the diffused light sensor 100 to detect an amount of light diffused. In step S103, the misalignment calculation unit 220, serving as a misalignment amount detection unit, calculates misalignment based on the detected amount of light diffused.

FIG. 6 is a schematic sectional view of the diffused light sensor 100 used in the image forming apparatus A depicted in FIG. 3. The diffused light sensor 100 includes a light emitter 110 and a light receiver 120. The light receiver 120 includes a chamber 123. The chamber 123 includes an entrance 122. The light emitter 110 includes a chamber 113. The chamber 113 includes an, exit 112.

The light emitter 110 including a light emitting element and the light receiver 120 including a light receiving element are provided in a single body. An optical axis 111 of the light emitter 110 coincides with a y-axis being a normal line to a detection surface 130, that is, the optical axis 111 is perpendicular to the detection surface 130. An optical axis 121 of the light receiver 120 is inclined at an angle of about 45 degrees or more with respect to the detection surface 130, so that the light receiver 120 does not receive light emitted by the light emitter 110 and specularly reflected from the detection surface 130. The chamber 123 is provided proximally of the light receiving element of the light receiver 120 between the light receiver 120 and the detection'surface 130. The entrance 122 of the chamber 123 allows only diffused light reflected from a pattern 131 to reach the light receiver 120.

It is important for the light receiving element to receive a decreased amount of specular light, since the specular light reflected from a wall 113A of the light emitter 110 and the detection surface 130 is a noise component for the diffused light sensor 100 when received by the light receiver 120. Therefore, according to the example embodiment, the exit 112 of the light emitter 110, serving as an opening of a light emitter, has a narrow opening size, so as to reduce an optical axis of the specular light. In addition, the wall 113A of the chamber 113 provided proximally of the light emitter 110 between the light emitter 110 and the detection surface 130 is formed into a V-shape to prevent the specular light reflected from the V-shaped wall 113A to pass out of the chamber 113 through the exit 112, thereby preventing an optical axis of the specular light reflected from a wall surface of the diffused light sensor 100 and the detection surface 130 of the transfer belt 18, serving as an image carrier, to reach the light receiver 120.

According to the example embodiment, the entrance 122 of the light receiver 120, serving as an opening of a light receiver, has a narrow opening size to prevent the specular light from entering the chamber 123. In addition, a wall 123A of the chamber 123 is formed into a V-shape to prevent the specular light reflected from the wall 123A from reaching the light receiving element of the light receiver 120, so that no specular light reflected from the wall 123A reaches the light receiving element. Such narrow openings provided in the exit 112 and the entrance 122 decrease an amount of light emitted by the light emitter 110, thereby reducing output of the diffused light sensor 10. However, provisions of the chamber 113 and the chamber 123 prevent the specular light incident on the light receiver 120 from reaching the light receiver 120 without decreasing the amount of light and reducing output of the diffused light sensor 10.

Figure 7:
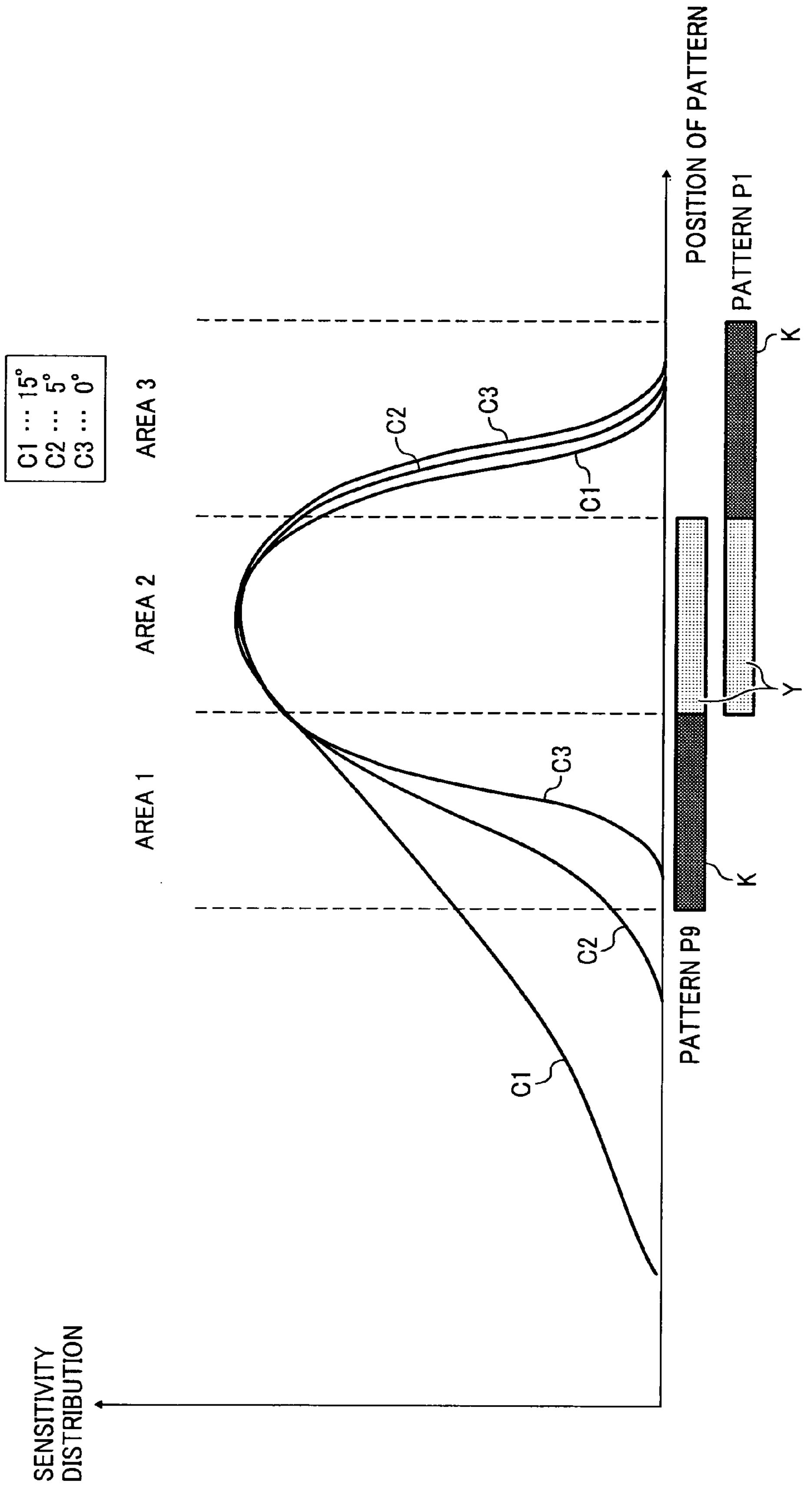
FIG. 7 is a graph illustrating distributions of sensitivity of the diffused light sensor shown in FIG. 6.

A description is now given of sensitivity of the diffused light sensor 100, using FIG. 7.

Figure 2:
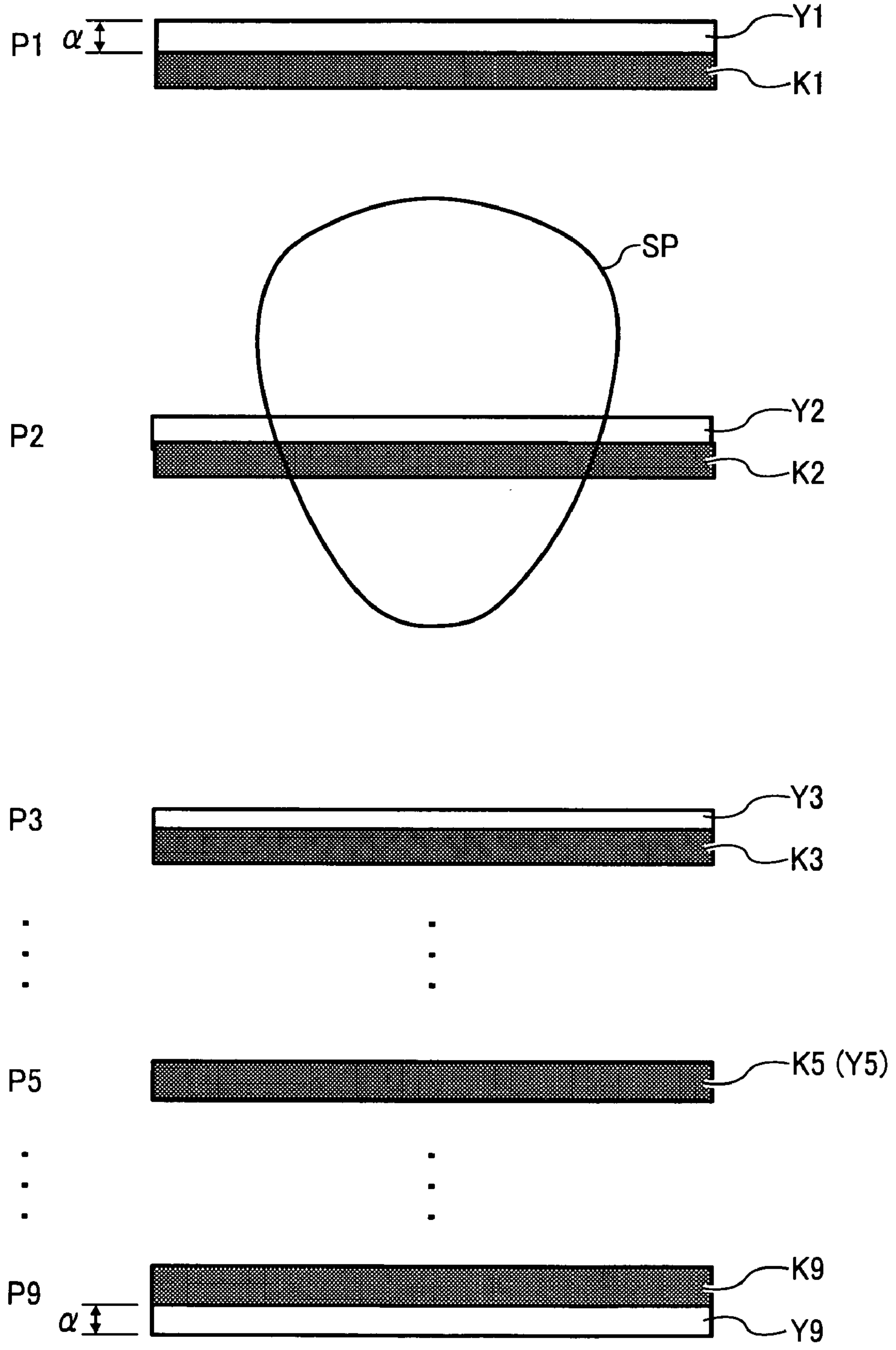
FIG. 2 RELATED ART
FIG. 2 is a schematic view of several examples of misalignment detection patterns and an area of detection by the diffused light sensor shown in FIG. 1.

FIG. 7 is a graph illustrating a result of evaluation of the diffused light sensor 100 detecting patterns P1 and P9 shown in FIG. 2 described above. In the patterns P1 and P9, the black patch K and the yellow patch Y are arranged in the opposite order and offset from each other by a same distance.

The evaluation was performed in three cases, C1, C2, and C3, in which the angle between the optical axis 111 of the light emitter 110 and the normal line to the detection surface 130 was 15 degrees, 5 degrees, and 0 degree, respectively. It is to be noted that the optical axis 121 of the light receiver 120 was inclined at an angle of 45 degrees or more with respect to the detection surface 130. A hypothetical line on the detection surface 130 of the transfer belt 18 in a three-dimensional space that most closely parallels a line connecting a center of the light emitter 110 with a center of the light receiver 120 is plotted on the horizontal axis, and output of the light emitter 110 is plotted on the vertical axis. An area 1 corresponds to an area of the black patch K of the pattern P9, an area 2 corresponds to an area of the yellow patch Y of the patterns P1 and P9, and an area 3 corresponds to an area of the black patch K of the pattern P1, respectively.

When the angle between the optical axis 111 of the light emitter 110 and the normal line to the detection surface 130 is 0 degree, the diffused light sensor 100 has the most symmetrical sensitivity distribution, as indicated by C3. However, when the angle between the optical axis 111 of the light emitter 110 and the normal line to the detection surface 130 is 5 degrees, sensitivity distribution of the diffused light sensor 100 becomes asymmetrical, as indicated by C2. When the angle between the optical axis 111 of the light emitter 110 and the normal line to the detection surface 130 is 15 degrees, sensitivity distribution of the diffused light sensor 100 becomes more asymmetrical, as indicated by C1.

Based on the sensitivity distribution of the diffused light sensor 100, evaluated values V1 and V2 of the patterns P1 and P9 are obtained.

The evaluated value V1 of the pattern P1 is obtained by the following formula (1):

$$V1=A1\times KB+A2\times YB \quad (1)$$

where A1 represents an area of distribution of the area 1, KB represents brightness of the black patch K, A2 represents an area of distribution of the area 2, and YB represents brightness of the yellow patch Y.

The evaluated value V9 of the pattern P9 is obtained by the following formula (2):

$$V9=A3\times KB+A2\times YB \quad (2)$$

where A3 represents an area of distribution of the area 3, KB represents brightness of the black patch K, A2 represents an area of distribution of the area 2, and YB represents brightness of the yellow patch Y.

Since the evaluated values V1 and V9 are proportional to the output of the diffused light sensor 100, a ratio of the two values V9:V1 defines an allowable range of the angle between the optical axis 111 of the light emitter 110 and the normal line to the detection surface 130, that is, y-axis, based on the required accuracy of detection by the diffused light sensor 100, which is useful for designing a structure of the diffused light sensor 100.

It is to be noted that, for greater accuracy, the above calculations may include brightness of a surface of the transfer belt 18. In addition, although the graph in FIG. 7 includes one-dimensional sensitivity distribution of the diffused light sensor 100 in a direction in which the diffused light sensor 100 detects the patterns P1 and P9 formed on the transfer belt 18, the graph may include two-dimensional sensitivity distribution of the diffused light sensor 100 detecting the patterns P1 and P9 in a direction of a z-axis perpendicular to a conveyance direction D of the transfer belt 18 with respect to a point of origin 0.

According to the above-described example embodiment, since the light emitter 110 of the diffused light sensor 100 directs light onto the pattern 131 substantially at a 90-degree angle to the pattern, the sensitivity distribution of the diffused light sensor 100 is substantially symmetrical with respect to a center of a peak of the yellow patch Y, which is a non-reference color. In addition, since no blind spot for the diffused light sensor 100 exists at either edge of the patterns P1 and P9 having the same amount of misalignment in the opposite directions, the outputs of the diffused light sensor 100 detecting the patterns P1 and P9 are equal.

According to this example embodiment, the light receiver 120 is provided downstream from the light emitter 110 in the conveyance direction D of the transfer belt 18, serving as an image carrier, as illustrated in FIG. 6. Alternatively, however, the light receiver 120 may be provided upstream from the light emitter 110 in the direction D. Therefore, toner particles hardly enter the chamber 123 through the entrance 122, serving as an opening. In addition, in order to emphasize symmetry of the light emitted by the light emitter 110, the light receiver 120 may be provided in a main scanning direction relative to the light emitter 110, that is, the optical axis 121 of the light receiver 120 may be inclined in the main scanning direction. Alternatively, the optical axis 121 of the light receiver 120 may be inclined in a direction oblique to both the main scanning direction and the sub-scanning direction. Additionally, positions of the light emitter 110 and the light receiver 120 may be exchanged. More specifically, the light receiver 120 may be provided in the normal direction to the detection surface 130, and the light emitter 110 may be inclined at an angle of about 45 degrees or less with respect to the normal line.

Figure 8:
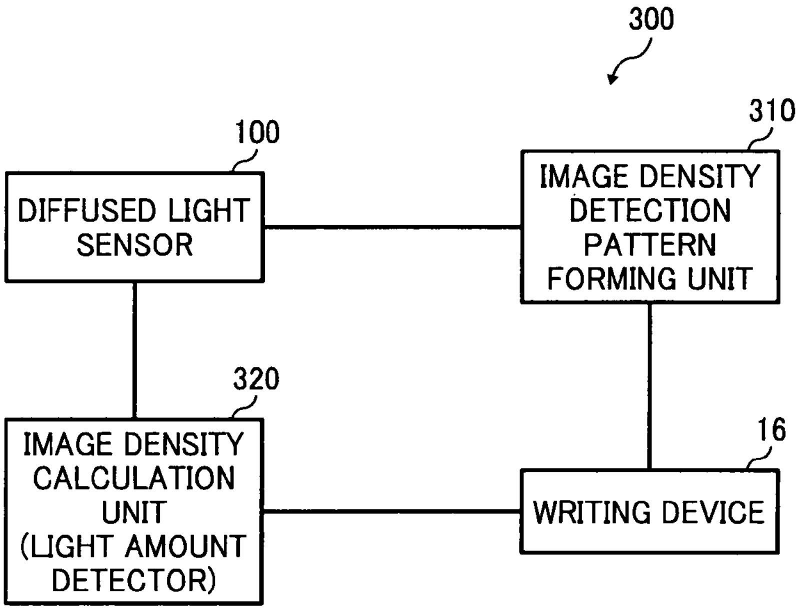
FIG. 8 is a block diagram of an image density calculation controller included in the image forming apparatus shown in FIG. 3 according to another example embodiment of the present invention.
Figure 9:
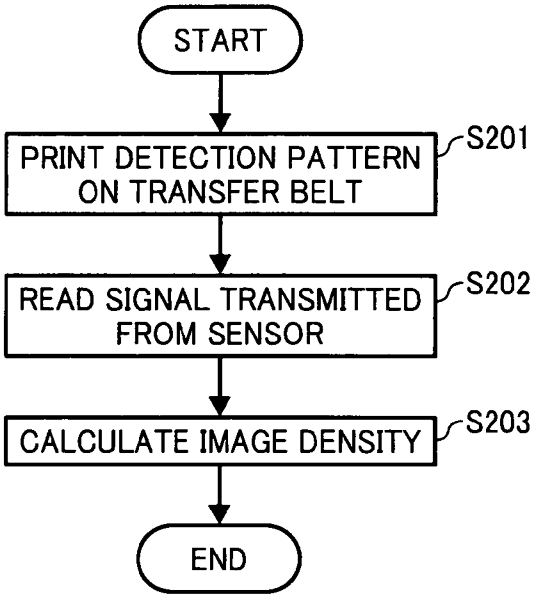
FIG. 9 is a flowchart illustrating an image density calculation process performed by the image density calculation controller shown in FIG. 8.

Referring to FIGS. 8 and 9, a description is now given of an image density calculation controller 300, which substitutes for the misalignment calculation controller 200 depicted in FIG. 4.

FIG. 8 is a schematic block diagram of the image density calculation controller 300. The image density calculation controller 300 includes an image density detection pattern forming unit 310, an image density calculation unit (light amount detector) 320, the diffused light sensor 100, and the writing unit 16. According to the previous example embodiment, the diffused light sensor 100 is used for the misalignment calculation controller 200, serving as a misalignment amount detector. However, according to this example embodiment, the diffused light sensor 100 is used for the image density calculation controller 300, serving as an image density detector. In image density detection, when a plurality of patterns (color patches) with different densities are formed on the transfer belt 18, the diffused light sensor 100 reads and detects an amount of light reflected from the plurality of patterns. Such detection can be used for image density control. It is to be noted that an image density detection pattern is known in the art, for example, as disclosed in Japanese patent application Nos. 9-238260 and 11-69159, and thus a description thereof is omitted here.

FIG. 9 is a flowchart illustrating a process of calculating image density. In step S201, when the image density detection pattern forming unit 310 commands the writing device 16 depicted in FIG. 3 to print an image density detection pattern, the writing device 16 prints the image density detection pattern on the transfer belt 18. In step S202, after the diffused light sensor 100 detects diffused light reflected from the image density detection pattern, the image density calculation unit 320, serving as a light amount detection unit, reads a signal transmitted from the diffused light sensor 100 to detect an amount of light diffused. In step S203, the image density calculation unit 320, serving as an image density detection unit, calculates the image density based on the detected amount of light.

The other elements of the image density calculation controller 300 are structurally and functionally equivalent to those of the misalignment calculation controller 200 depicted in FIG. 4.

According to the above-described example embodiment, since the angle between the optical axis 111 of the light emitter 110 and the normal line to the detection surface 130 is 0 degree, the light emitted by the light emitter 110 is directed onto a focal point of the image density detection pattern substantially at a 90-degree angle to the pattern, thereby reducing a difference in sensitivity distribution of the diffused light sensor 100 detecting the image density detection pattern before and after the focal point, as well as reducing the specular light as a noise component for the diffused light sensor 100 reaching the light receiver 120, so that the diffused light sensor 100 can detect the image density detection pattern with improved precision.

The present invention has been described above with reference to specific example embodiments. Nonetheless, the present invention is not limited to the details of example embodiments described above, but various modifications and improvements are possible without departing from the spirit and scope of the present invention. The number, position, shape, and the like, of the above-described constituent elements are not limited to the above-described example embodiments, but may be modified to the number, position, shape, and the like, which are appropriate for carrying out the present invention. It is therefore to be understood that within the scope of the associated claims, the present invention may be practiced otherwise than as specifically described herein. For example, elements and/or features of different illustrative example embodiments may be combined with each other and/or substituted for each other within the scope of the present invention.

What is claimed is:

1. A light amount detector, comprising:

a light emitter configured to direct light onto a detection pattern formed on a detection surface of an image carrier;

a light receiver configured to detect diffused light reflected from the detection pattern; and a light amount detection unit configured to detect an amount of light received by the light receiver based on detection output of the light receiver, wherein one of the light emitter and the light receiver being provided at a position directly opposite to the detection surface, such that a distribution of sensitivity of the light receiver detecting the diffused light is substantially symmetrical with respect to a detection output peak when the detection surface is substantially parallel to a hypothetical line connecting the light emitter with the light receiver, and based on the sensitivity distribution of the diffused light sensor, evaluated values of a plurality of patterns are obtained such that a ratio of the evaluated values defines an allowable range of angles between an optical axis of the light emitter and a normal line to the detection surface.

2. The light amount detector according to claim 1, wherein the one of the light emitter and the light receiver is disposed so that an optical axis thereof substantially coincides with a normal line to the detection surface.

3. The light amount detector according to claim 1, wherein the light emitter and the light receiver are provided in a single body, each of the light emitter and the light receiver comprising a chamber provided proximally of each of the light emitter and the light receiver between each of the light emitter and the light receiver and the detection surface, the chamber comprising an opening configured to pass light, at least one wall of the chamber forming a V-shaped concave surface configured to prevent specular light reflected therefrom and from the detection surface from reaching the light receiver.

4. The light amount detector according to claim 1, wherein the evaluated values are obtained when the angle between the optical axis of the light emitter and the normal line to the detection surface is at least one of 0 degrees, 5, degrees, and 15 degrees.

5. The light amount detector according to claim 4, wherein the angle between the optical axis of the light emitter and the normal line to the detection surface at 0 degrees provides the most symmetrical sensitivity distribution.

6. The light amount detector according to claim 1, wherein the evaluated value of one of the pattern is obtained by the following formula:

$$V=A1\times KB+A2\times YB$$

where A1 represents an area of distribution of area 1, KB represents brightness of a black patch K, A2 represents an area of distribution of area 2, and YB represents brightness of a yellow patch Y.

7. The light amount detector according to claim 1, wherein the evaluated value of one of the pattern is obtained by the following formula:

$$V=A3\times KB+A2\times YB$$

where A3 represents an area of distribution of area 3, KB represents brightness of a black patch K, A2 represents an area of distribution of area 2, and YB represents brightness of a yellow patch Y.

8. A misalignment amount detector, comprising:

a light amount detector configured to detect an amount of light, including:

a light emitter configured to direct light onto a detection pattern formed on a detection surface of an image carrier;

a light receiver configured to detect diffused light reflected from the detection pattern; and a light amount detection unit configured to detect an amount of light received by the light receiver based on detection output of the light receiver, one of the light emitter and the light receiver being provided at a position directly opposite to the detection surface, such that a distribution of sensitivity of the light receiver detecting the diffused light is substantially symmetrical with respect to an output detection peak when the detection surface almost parallel to a line connecting the light emitter with the light receiver is plotted on a horizontal axis, and based on the sensitivity distribution of the diffused light sensor, evaluated values of a plurality of patterns are obtained such that a ratio of the evaluated values defines an allowable range of angles between an optical axis of the light emitter and a normal line to the detection surface; and a misalignment amount detection unit configured to detect an amount of misalignment based on a result of detection by the light amount detector detecting the detection pattern formed as a misalignment detection pattern.

9. The misalignment amount detector according to claim 8, wherein the evaluated values are obtained when the angle between the optical axis of the light emitter and the normal line to the detection surface is at least one of 0 degrees, 5, degrees, and 15 degrees.

10. The misalignment amount detector according to claim 9, wherein the angle between the optical axis of the light emitter and the normal line to the detection surface at 0 degrees provides the most symmetrical sensitivity distribution.

11. The misalignment amount detector according to claim 8, wherein the evaluated value of one of the pattern is obtained by the following formula:

$$V=A1\times KB+A2\times YB$$

where A1 represents an area of distribution of area 1, KB represents brightness of a black patch K, A2 represents an area of distribution of area 2, and YB represents brightness of a yellow patch Y.

12. The misalignment amount detector according to claim 8, wherein the evaluated value of one of the pattern is obtained by the following formula:

$$V=A3\times KB+A2\times YB$$

where A3 represents an area of distribution of area 3, KB represents brightness of a black patch K, A2 represents an area of distribution of area 2, and YB represents brightness of a yellow patch Y.

13. An image density detector, comprising:

a light amount detector configured to detect an amount of light, the light amount detector including:

a light emitter configured to direct light onto a detection pattern formed on a detection surface of an image carrier;

a light receiver configured to detect diffused light reflected from the detection pattern; and a light amount detection unit configured to, detect an amount of light received by the light receiver based on detection output of the light receiver, one of the light emitter and the light receiver being provided at a position directly opposite to the detection surface, such that a distribution of sensitivity of the light receiver detecting the diffused light is substantially symmetrical with respect to a detection output peak when the detection surface is substantially parallel to a hypothetical line connecting the light emitter and the light receiver, and based on the sensitivity distribution of the diffused light sensor, evaluated values of a plurality of patterns are obtained such that a ratio of the evaluated values defines an allowable range of angles between an optical axis of the light emitter and a normal line to the detection surface; and an image density detection unit configured to detect image density based on a result of detection by the light amount detector detecting the detection pattern formed as an image density detection pattern.

14. The image density detector according to claim 13, wherein the evaluated values are obtained when the angle between the optical axis of the light emitter and the normal line to the detection surface is at least one of 0 degrees, 5, degrees, and 15 degrees.

15. The image density detector according to claim 14, wherein the angle between the optical axis of the light emitter and the normal line to the detection surface at 0 degrees provides the most symmetrical sensitivity distribution.

16. The image density detector according to claim 13, wherein the evaluated value of one of the pattern is obtained by the following formula:

$$V=A1\times KB+A2\times YB$$

where A1 represents an area of distribution of area 1, KB represents brightness of a black patch K, A2 represents an area of distribution of area 2, and YB represents brightness of a yellow patch Y.

17. The image density detector according to claim 13, wherein the evaluated value of one of the pattern is obtained by the following formula:

$$V=A3\times KB+A2\times YB$$

where A3 represents an area of distribution of area 3, KB represents brightness of a black patch K, A2 represents an area of distribution of area 2, and YB represents brightness of a yellow patch Y.

* * * * *